3,288,849
PROCESS FOR PURIFYING TEREPHTHALIC ACID
Delbert H. Meyer, Highland, Ind., assignor to Standard Oil Company, Chicago, Ill., a corporation of Indiana
No Drawing. Filed Dec. 18, 1963, Ser. No. 331,377
3 Claims. (Cl. 260—525)

This invention relates to the purification of terephthalic acid and more particularly pertains to the removal of 4-carboxybenzaldehyde from crude terephthalic acid.

Terephthalic acid is produced by nitric acid oxidation of p-xylene and other p-dialkylbenzenes. Terephthalic acid is also produced through the catalytic isomerization of potassium salts of ortho- and iso-phthalic acids or through heating potassium benzoate in the presence of carbon dioxide. Terephthalic acid is produced by a catalytic liquid phase oxidation of p-dialkylbenzenes, e.g. p-xylene, with molecular oxygen, e.g. air, in the presence of an inert solvent such as acetic acid or benzoic acid and in the presence of a catalyst system provided by bromine and a heavy metal oxidation catalyst. Other methods have been proposed and are said to be useful in the preparation of terephthalic acid. All of the foregoing processes, when used commercially, result in a crude terephthalic acid product. By "crude terephthalic acid product" is meant that product obtained directly from the process from which it is produced.

The preparation of terephthalic acid by the oxidation of p-xylene with molecular oxygen in the presence of promoted heavy metal oxidation catalyst produces a terephthalic acid product which has 4-carboxybenzaldehyde (4-CBA) and objectionable color bodies as undesirable by-products. Subjecting such a crude terephthalic acid to recrystallization for example, from water, is not an efficient technique for removing 4-CBA and color bodies. The most efficient method to obtain the objective of removing 4-CBA and color bodies known to date is to dissolve in water the crude terephthalic acid as its alkali metal salt, preferably its sodium salt in aqueous solution and treat this aqueous solution with sodium hypochlorite at a pH greater than 9. Thereafter the hypochlorite treated solution is neutralized to a pH of 6–6.4, carbon treated and the carbon treated solution acidified to spring purified terephthalic acid. This method of treatment requires the use of two equivalents each of base and acid to put the terephthalic acid into solution and then to regenerate terephthalic acid again. The method of this invention avoids both the use of base for salt formation and also the gross amounts of acid for regeneration.

It appears that each different process produces a crude terephthalic acid product containing its own characteristic impurities which impurities are other than colored by-products and/or tars. To obtain terephthalic acid of a purity of 99% or higher many chemical purification techniques have been disclosed to be used to act upon crude terephthalic acid products. The amount of chemical reactants useful for accomplishing the chemical purification is, of course, dependent upon the amount of impurity present. Many of the impurities are of a chemical and/or physical nature closely related to chemical and/or physical properties of terephthalic acid. To obtain terephthalic acid of 99% or higher purity by a technique of treating crude terephthalic acid products and eliminate the concurrent or subsequent use of other chemical compounds to obtain a terephthalic acid product of 99+% purity would be highly desirable.

A technique has been discovered whereby crude terephthalic acid product is treated in solution with hypophosphorus acid at elevated temperature to obtain a terephthalic acid product of 99+% purity. This technique is applicable to the crude terephthalic acid product obtained by the catalytic liquid phase oxidation of p-dialkylbenzenes, e.g., p-xylene with molecular oxygen, e.g. air, in the presence of a monocarboxylic acid solvent such as the lower saturated aliphatic acids of the acetic acid series ($C_2$ to $C_7$ aliphatic monocarboxylic acids) or benzoic acid also in the presence of a catalyst system provided by bromine and a heavy metal oxidation catalyst. Since the oxidation reaction mechanisms involved in other catalytic liquid phase oxidation systems using as a promoter for the heavy metal oxidation catalyst, especially cobalt, dialkyl-ketones (methylethyl ketone) or aliphatic aldehydes (acetaldehyde) also appear to produce the 4-CBA by-product impurity produced in the aforementioned catalytic oxidation process employing the catalyst system provided by bromine and heavy metal; the process of this invention is applicable to all three of these catalytic liquid phase oxidation processes using the indicated promoters for the heavy metal oxidation catalyst although the promoters differ in kind.

The technique of this invention whereby high purity terephthalic acid product, 99+%, is obtained is carried out by treating with hypophosphorus acid a solution of a crude terephthalic acid product obtained from any one of the aforementioned three liquid phase catalytic air oxidations employing a promoter for heavy metal oxidation catalyst. The solution can first be formed and then hypophosphorus acid added or the solution can be formed in a solvent containing hypophosphorus acid.

The method of this invention preferably is carried out using water as the solvent for forming the solution of crude terephthalic acid. Other solvents can be used as long as they do not react with, decompose or in any other way change with the identity of hypophosphorus acid. The solubility of terephthalic acid in various solvents is known to be quite low at ordinary temperatures. For this reason it is desirable to employ the method of this invention at elevated temperatures so that useful amounts of terephthalic acid may be taken into solution. With respect to water, the following solubility data in grams of terephthalic acid per hundred grams of water is given.

| TA, g./100 g. $H_2O$: | T° C. for solution |
|---|---|
| 1 | 185 |
| 5 | 225 |
| 10 | 242 |
| 20 | 259 |
| 50 | 272 |

The amount of hypophosphorus acid to be used is desirably above one mole for each mole of 4-CBA present in the crude terephthalic acid. Since the amount of 4-CBA present in crude terephthalic acid is generally under 3% by weight based on the crude terephthalic acid product, amounts of hypophosphoric acid even up to 5 to 10 moles per mole of 4-CBA present would not represent the use of large amounts of chemical treating agent. More than 10 moles of hypophosphorus acid per mole of 4-CBA can be used, but in general such amounts above 10 moles per mole of 4-CBA will afford little additional improvement.

When employing water, the preferred solvent, the preferred operating temperature is in the range of 200 to 275° C. since at temperatures within this range provide for at least 50 parts terephthalic acid per one hundred parts of water in forming the solution of terephthalic acid and thus represents an efficient use of the solvent medium.

The time of treating with hypophosphorus acid according to this invention is not critical and in designing a continuous treating process a retention time in the range of 5 to 60 minutes could be used. Such contact time can also be used for batch operation. If necessary or desired, the aqueous solution after treatment with hypophosphorus acid can be percolated through a carbon bed to remove color bodies and any trace of 4-CBA that remains. It is appreciated, of course, that when temperatures above 100° C. are employed the hypophosphorus acid treatment according to the method of this invention requires the use of super-atmospheric pressure to retain many of the solvents, especially water, in the liquid phase. The carbon treating step if desired can also be carried out under pressure to retain the water in the liquid phase.

After treatment according to the method of this invention the aqueous solution can be cooled to a temperature at least as low as 100° C., depressurized and a terephthalic acid product of high purity recrystallizing from solution can be recovered by any method for separating liquid and solid phases as, for example, decantation, filtration, centrifugation and the like.

The interest in producing terephthalic acid as a commercial product is for its use directly or indirectly in the manufacture of linear high molecular weight polyesters such as those esters derived from diols, especially glycol. There are two routes to such linear high molecular weight polyesters. One route is to convert terephthalic acid to its dimethyl ester and then purify the dimethyl ester to a molar purity in excess of 99% purity; then react the dimethyl ester with the diol to produce by ester interchange a second ester and then through a high temperature polycondensation product produce, for example, polyethylene terephthalate. The second route, for example, to polyethylene terephthalate involves reacting an especially high purity terephthalic acid, purity in excess of 99%, directly with ethylene glycol and then carrying out the polycondensation. The terephthalic acid produced by the technique of this invention is particularly useful in the production of polyethylene terephthalate by direct reaction with ethylene glycol. Also, in the production of dimethyl terephthalate the purified terephthalic acid produced by the technique of this invention can result in high purity crude dimethyl terephthalate (the dimethyl terephthalate product directly recovered from the esterification reaction) and thus reduce the severity of crude dimethyl terephthalate purification and permit on a once through consideration higher yields of purified dimethyl terephthalate.

To illustrate the method of this invention the following example is submitted. There is heated in a rocker bomb (316 stainless steel) 30 g. of terephthalic acid having a 4-CBA content of 2.58% by weight, 350 ml. of water and 5.75 ml. of 50% hypophosphorous acid at 250° C. for one hour. Thereafter the bomb and its contents are cooled to 30° C. and the contents of the bomb filtered. The terephthalic acid recovered by filtration is washed with water and dried. The recovered purified terephthalic acid has a 4-CBA content of 0.02% by weight. In contrast to this, recrystallization of similar crude terephthalic acid from water under the same conditions has resulted in the removal of 27–72% of the original 4-CBA content. Thus, by the method of this invention a very substantial effect of a small amount of hypophosphorus acid is demonstrated.

There has been obtained by the process of this invention purified terephthalic acid having an optical density as determined by spectrophotometer measurement of a 4% solution of terephthalic acid in a 1:1 ammonia (density of 0.88) to water in a 4 cm. cell at 380 m$\mu$ of 0.150. Terephthalic acid of such purity when reacted directly with ethylene glycol produces a polyethylene terephthalate very light in color and having a melting point of about 265° C. which is acceptable for spinning fibers.

What is claimed is:

1. A method of purifying crude terephthalic acid having 4-carboxybenzaldehyde as its main impurity and said 4-carboxybenzaldehyde content of below 3% by weight which comprises treating a solution of said crude terephthalic acid dissolved in a solvent inert to hypophosphorous acid with at least one mole of hypophosphorus acid per mole of 4-carboxybenzaldehyde present in said crude terephthalic acid and separating solid terephthalic acid from said treated solution.

2. The method of claim 1 wherein the solvent in which crude terephthalic acid is dissolved is water.

3. The method of claim 2 wherein crude terephthalic acid is dissolved in water at a temperature in the range of 200 to 275° C. under elevated pressure to maintain water in the liquid phase.

References Cited by the Examiner
UNITED STATES PATENTS 2,899,466  8/1959  O'Neill _____ 260—525

LORRAINE A. WEINBERGER, *Primary Examiner.*

S. B. WILLIAMS, *Assistant Examiner.*